United States Patent
Clark et al.

(10) Patent No.: US 10,655,664 B2
(45) Date of Patent: May 19, 2020

(54) FASTENER ASSEMBLY HAVING ONE OR MORE GROMMETS

(71) Applicant: Illinois Tool Works Inc., Glenview, IL (US)

(72) Inventors: Chad M. Clark, Stamping Ground, KY (US); Michael E. Fullerton, Clarkston, MI (US)

(73) Assignee: Illinois Tool Works Inc., Glenview, IL (US)

( * ) Notice: Subject to any disclaimer, the term of this patent is extended or adjusted under 35 U.S.C. 154(b) by 329 days.

(21) Appl. No.: 15/691,848

(22) Filed: Aug. 31, 2017

(65) Prior Publication Data

US 2018/0094667 A1 Apr. 5, 2018

Related U.S. Application Data

(60) Provisional application No. 62/403,802, filed on Oct. 4, 2016.

(51) Int. Cl.
| | |
|---|---|
| *F16B 21/18* | (2006.01) |
| *F16B 21/06* | (2006.01) |
| *F16B 5/02* | (2006.01) |
| *F16B 43/00* | (2006.01) |
| *F16B 21/07* | (2006.01) |

(52) U.S. Cl.
CPC ............ *F16B 21/06* (2013.01); *F16B 5/0258* (2013.01); *F16B 21/075* (2013.01); *F16B 43/001* (2013.01)

(58) Field of Classification Search
USPC ........................ 411/353, 369, 544; 267/141.4
See application file for complete search history.

(56) References Cited

U.S. PATENT DOCUMENTS

| | | | | |
|---|---|---|---|---|
| 4,522,378 A | * | 6/1985 | Nelson ................... | F16B 5/0258 16/2.1 |
| 5,842,677 A | * | 12/1998 | Sweeney ............... | F16F 1/3835 248/635 |
| 5,871,319 A | * | 2/1999 | Schneider ............. | F16B 33/004 411/107 |
| 6,280,132 B1 | * | 8/2001 | Szczukowski .......... | F02F 7/006 411/107 |
| 6,523,817 B1 | * | 2/2003 | Landry, Jr. ............ | F16F 1/3732 267/141.2 |
| 6,585,468 B2 | * | 7/2003 | Johnson ................ | F16B 41/002 29/437 |
| 7,185,873 B2 | * | 3/2007 | Suka ...................... | B60K 17/24 248/635 |
| 7,771,149 B2 | * | 8/2010 | Bauer ................... | F16B 41/002 411/353 |
| 8,454,290 B2 | * | 6/2013 | Schaser ................. | F16B 5/0241 248/576 |
| 8,511,656 B2 | * | 8/2013 | Yahata .................. | F16F 1/3863 248/635 |
| 8,926,247 B2 | | 1/2015 | Schaser | |
| 8,950,738 B2 | * | 2/2015 | Nakamura ............ | F16F 1/3735 267/140.13 |

* cited by examiner

*Primary Examiner* — Gary W Estremsky
(74) *Attorney, Agent, or Firm* — Quarles & Brady LLP (57) ABSTRACT

A fastener assembly is configured to securely couple to a component. The fastener assembly includes at least one bushing, a first grommet that is coupled to the bushing(s), and a second grommet that is coupled to the bushing(s). The first grommet and the second grommet are configured to securely retain the component therebetween.

18 Claims, 8 Drawing Sheets

FASTENER ASSEMBLY HAVING ONE OR MORE GROMMETS

RELATED APPLICATIONS

This application relates to and claims priority benefits from U.S. Provisional Patent Application No. 62/403,802, entitled "Fastener Assembly," filed Oct. 4, 2016, which is hereby incorporated by reference in its entirety.

FIELD OF EMBODIMENTS OF THE DISCLOSURE

Embodiments of the present disclosure generally relate to fastener assemblies, and, more particularly, to fastener assemblies including one or more grommets.

BACKGROUND

Various assemblies include panels, components, or other such objects connected to one another. Automobile assemblies, for example, include various panels and structures connected to other panels or structures, or to an automobile frame. Fasteners are used to secure various components to portions of a vehicle.

Fasteners are used to secure various components together in a variety of applications. One type of fastener assembly includes a bolt positioned within metal bushings. Each metal bushing includes a generally flat flange integrally connected to a hollow column, which is generally perpendicular to the flange. The columns are positioned within a channel or opening formed through a work-piece component that is to be secured to and isolated from another component through the fastener assembly In order to secure a known H-style grommet to a component, the grommet is urged through a hole in the component and then a metal stamping or bushing is shoved into the grommet. This process is difficult and cumbersome, and requires relatively high insertion forces and component strength. That is, the force needed to insert the grommet into the hole of the component and insert the bushing may cause damage to the grommet and/or the component. Indeed, components formed of certain materials, such as carbon fiber, may not be able to withstand the high insertion forces used to insert the grommet into the component, for example.

SUMMARY OF EMBODIMENTS OF THE DISCLOSURE

A need exists for a grommet that may be easily, safely, and securely coupled to a component. Further, a need exists for a simpler process of securing a grommet to a component.

With those needs in mind, certain embodiments of the present disclosure provide a fastener assembly that is configured to securely couple to a component. The fastener assembly includes at least one bushing, a first grommet that is coupled to the bushing(s), and a second grommet that is coupled to the bushing(s). The first grommet and the second grommet are configured to securely retain the component therebetween.

One of the first grommet or the second grommet securely couples to the bushing(s) to form a fastener sub-assembly. The fastener sub-assembly is formed by fitting the first grommet or the second grommet around the bushing, and fitting the bushing onto a fastener.

In at least one embodiment, each of the first grommet and the second grommet includes a base integrally connected to a collar that is opposite from the base through a circumferential outer wall. A central passage is formed through the grommet between and through the base and the collar. A rim outwardly extends from a surface of the base. The outer wall may taper inwardly from the base to the collar.

In at least one embodiment, the central passage includes a first end opening defined by an inner diameter of the collar that connects to a second end opening defined by an inner diameter of the rim. An inwardly-canted inner ledge forms a decreased diameter of the central passage proximate to a middle section. A reduced neck is defined between the inner ledge and the second end opening. The second end opening is defined by an outwardly-flared inner wall that outwardly flares from the reduced neck.

The fastener assembly may also include a fastener including a shaft that is retained within an interior channel of a tube of the bushing(s). In at least one embodiment, the fastener includes at least one protuberance that is configured to abut into an inner surface of the tube to securely couple the fastener to the bushing(s). The bushing(s) may include at least one protuberance that is configured to abut into an exterior surface of the fastener to securely couple the fastener to the bushing. The fastener assembly may also include a retaining nut that securely clamps a head of the fastener to a flange of the bushing(s).

The first grommet may be inverted in relation to the second grommet. The first grommet and the second grommet are configured to be on opposite sides of the component.

Each of the first grommet and the second grommet are separately coupled to the bushing(s). The first grommet is not fixed to the second grommet.

In at least one embodiment, the first grommet includes a first rim, and the second grommet includes a second rim. The first rim is oriented toward the second rim. A gap is formed between the first rim and the second rim in an at-rest state. The gap is reduced when the first grommet is compressed into the second grommet.

In at least one embodiment, each of the first grommet and the second grommet includes at least one inwardly-directed protuberance that abuts into an outer portion of the bushing(s) to securely couple the first grommet and the second grommet to the bushing(s).

In at least one embodiment, the bushing(s) includes at least one outwardly-directed protuberance that abuts into an inner portion of at least one of the first grommet and the second grommet to securely couple the bushing(s) to the first grommet and/or the second grommet.

One or both of the first grommet and/or the second grommet may include an elastomeric isolator molded onto a metal core.

One or both of the first grommet and/or the second grommet may be spaced apart from a tube of the bushing(s).

The fastener assembly may include a first bushing and a second bushing. The first grommet securely couples to the first bushing, while the second grommet securely couples to the second bushing.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE DISCLOSURE

Embodiments of the present disclosure provide a fastener assembly having a compression limiter (for example, a bushing) and molded elastomeric members (for example, grommets) that are configured to dampen noise and vibrations, while isolating the fastener assembly from a component, such as an engine cover to which the fastener assembly secures. In at least one embodiment, the fastener assembly includes a fastener (such as a bolt), a compression limiter, a top grommet attached to the compression limiter, and a separate bottom grommet that retains the assembly to the component (for example, an engine cover).

In order to assemble the fastener assembly, the top grommet, fastener, and the compression limiter may first be assembled together to form a sub-assembly. The sub-assembly may then be placed into a clearance hole/slot in the component. Next, the bottom grommet may be snapped and/or pressed onto the compression limiter to retain the assembly to the component. The grommet(s) may include a drawn metal stamping compression limiter, such as within an inner diameter.

In at least one embodiment, the grommet captures and carries a drawn metal stamping (compression limiter) with an accompanying bolt captured in the stamping. This embodiment may be used in configurations that utilize tapped threaded holes for attachment points.

In at least one other embodiment, the grommet captures and carries a drawn metal stamping (compression limiter) with an accompanying plastic nut retainer and metal flange nut attached to the top surface of the drawn metal stamping. This embodiment may be used in configurations that utilize threaded studs for attachment points.

Embodiments of the present disclosure provide improvements over known H-style grommets. Embodiments of the present disclosure may be inserted using less force than the H-style grommet, and may be used in applications that are generally unable to withstand high insertion forces, such as carbon fiber components.

Embodiments of the present disclosure also provide the added feature of noise, vibration, and/or material isolation between the component (for example, an engine cover) and the fastener assembly. Embodiments of the present disclosure also allow the fastener to be captured. Also, embodiments of the present disclosure provide a fastener assembly that is able to allow for positional shift by varying a diameter of a portion thereof. The fastener assembly may be inserted into a simple hole or slot in a component with a low insertion force. Further, embodiments of the present disclosure may be used with a wide range of grommet stiffness, including the use of very stiff grommets, thereby providing customizable clamp loads on a component.

Embodiments of the present disclosure provide a robust fastening method and provide greater clamp down forces over previous designs which are known to come unfastened in crash tests. A grommet may be press fit onto a ball stud. The threaded joint fastening method can be designed to be torqued to a desired clamp load amount.

Further, embodiments of the present disclosure provide a cost savings over traditional two-piece snap designs that require two limiters, two grommets, and a component to retain the two sides together, as the fastener assembly does not require a second grommet and an additional retention component.

Embodiments of the present disclosure provide a fastener assembly that is easy to install. Certain prior known fastener assemblies do not capture the fastener or fastening nut into an engine component before being shipped to the engine assembly plant. As such, such prior known designs require an individual to manually attach components to the cover or plastic component, then attach to the engine manually.

Figure 1A:
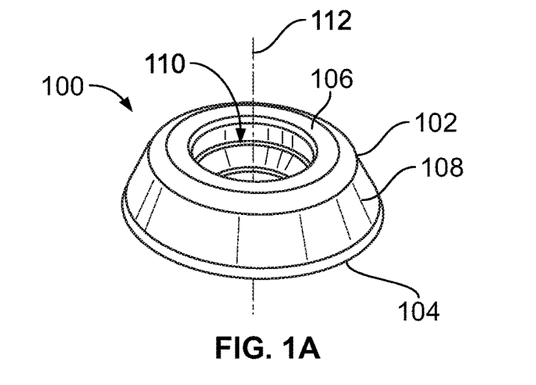
FIG. 1A illustrates a perspective top view of a grommet, according to an embodiment of the present disclosure.

FIG. 1A illustrates a perspective top view of a grommet 100, according to an embodiment of the present disclosure. The grommet 100 includes a main body 102, which may be formed of an elastomeric material, such as rubber. The main body 102 includes a base 104 that is integrally connected to an opposite collar 106 through a circumferential outer wall 108. The outer wall 108 tapers inwardly from the base 104 to the collar 106. The outer wall 108 inwardly cants from the base 104 to the collar 106, thereby providing an inwardly-beveled surface from the base 104 to the collar 106. Accordingly, a diameter of the base 104 is greater than a diameter of the collar 106.

A central passage 110 is formed through the grommet 100. The central passage 110 may be coaxial with a central longitudinal axis of the grommet 100. The passage 110 passes through the grommet 100 between and through the base 104 and the collar 106.

Figure 1B:
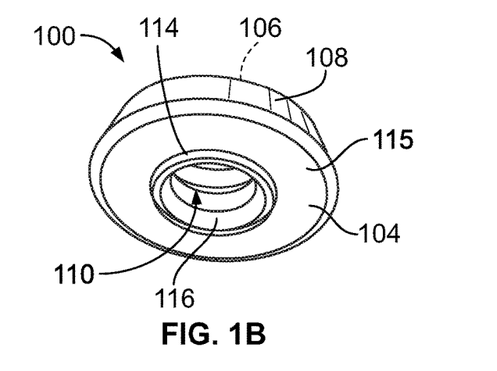
FIG. 1B illustrates a perspective bottom view of a grommet, according to an embodiment of the present disclosure.

FIG. 1B illustrates a perspective bottom view of the grommet 100. A rim 114 outwardly extends from a surface 115 of the base 104 surrounding an end opening 116 of the passage 110. The surface 115 may be a flat, planar surface.

Figure 1C:
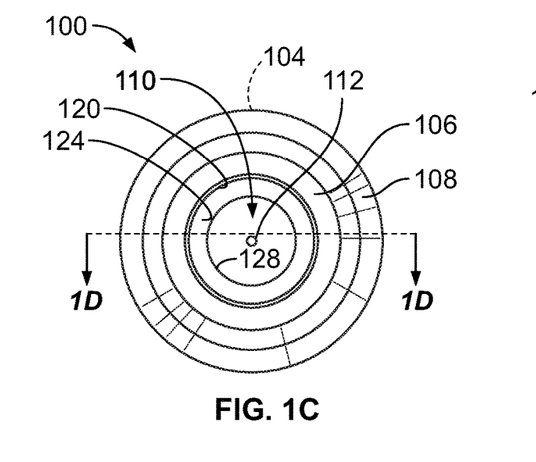
FIG. 1C illustrates a top view of a grommet, according to an embodiment of the present disclosure.
Figure 1D:
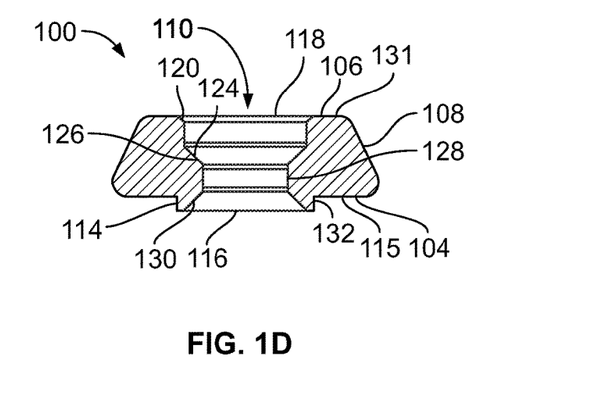
FIG. 1D illustrates an axial cross-sectional view of a grommet through line 1D-1D of FIG. 1C, according to an embodiment of the present disclosure.
Figure 1E:
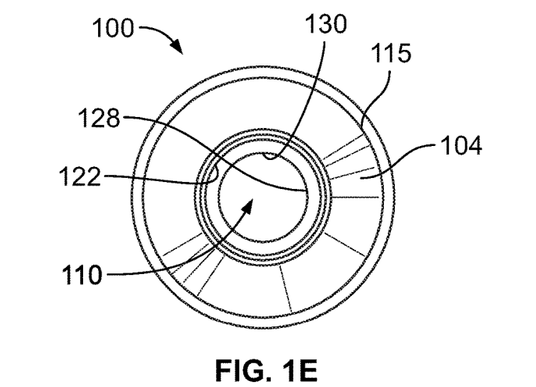
FIG. 1E illustrates a bottom view of a grommet, according to an embodiment of the present disclosure.
Figure 1F:
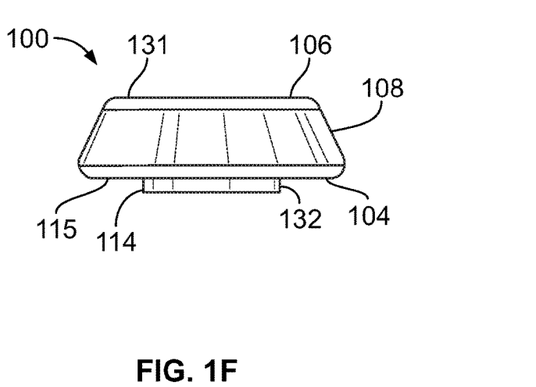
FIG. 1F illustrates a lateral view of a grommet, according to an embodiment of the present disclosure.
Figure 2A:
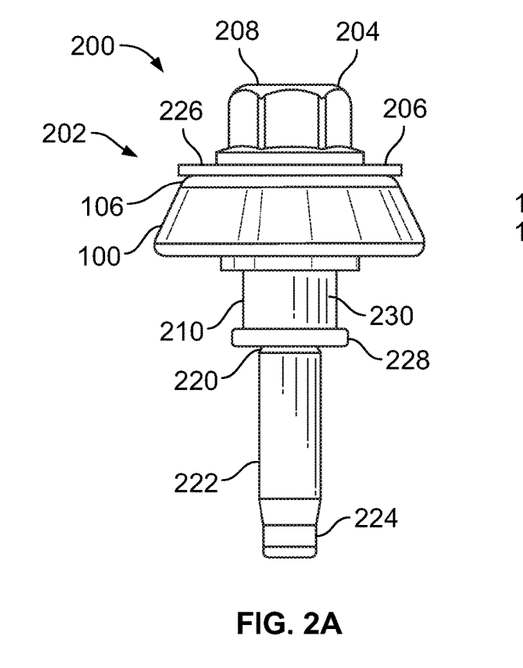
FIG. 2A illustrates a lateral view of a fastener assembly including the grommet secured thereto, forming a sub-assembly, according to an embodiment of the present disclosure.
Figure 2B:
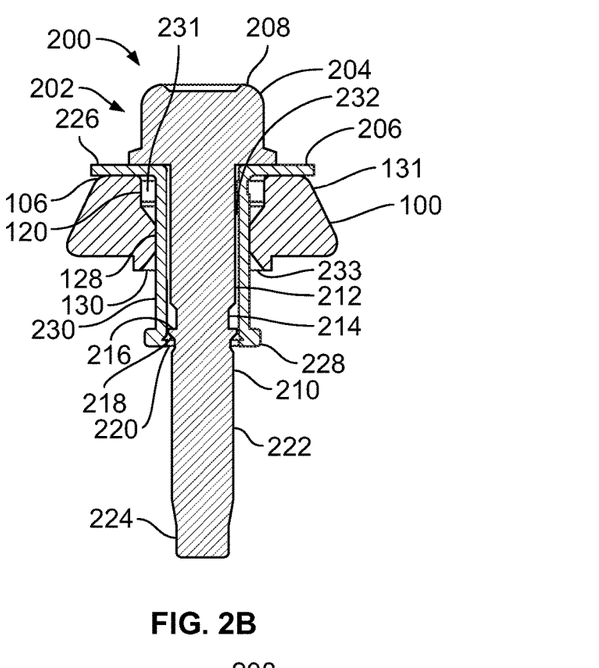
FIG. 2B illustrates an axial cross-sectional view of a fastener assembly including the grommet secured thereto, forming a sub-assembly, according to an embodiment of the present disclosure.
Figure 2C:
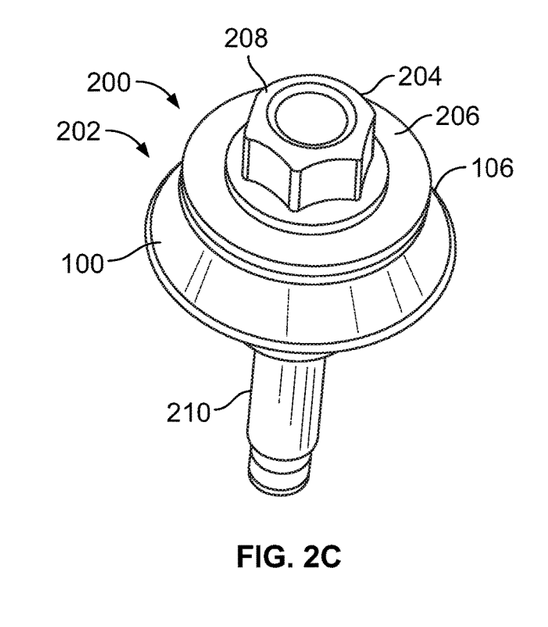
FIG. 2C illustrates a perspective top view of a fastener assembly including the grommet secured thereto, forming a sub-assembly, according to an embodiment of the present disclosure.
Figure 2D:
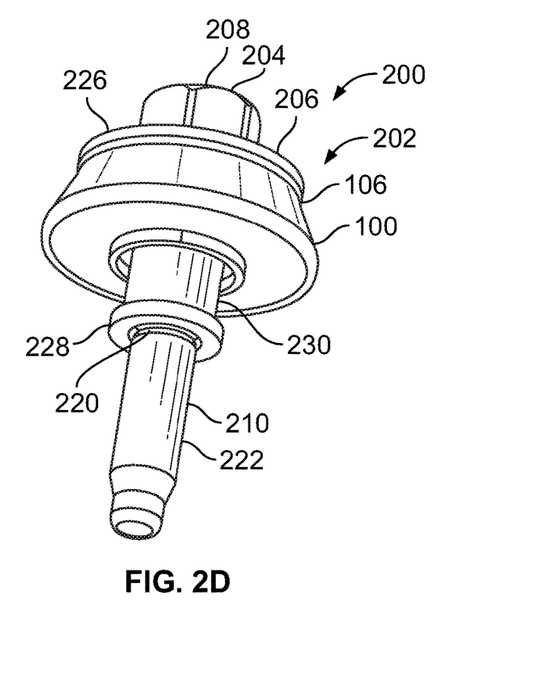
FIG. 2D illustrates a perspective bottom view of a fastener assembly including the grommet secured thereto, forming a sub-assembly, according to an embodiment of the present disclosure.
Figure 3A:
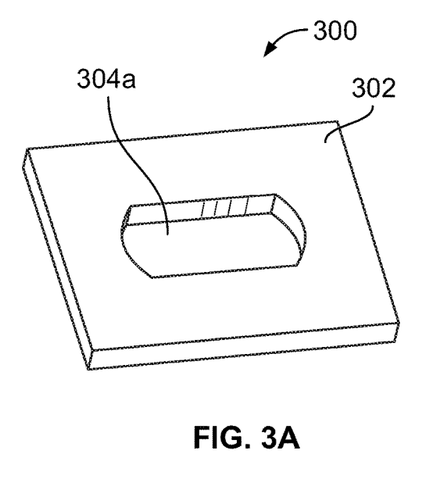
FIG. 3A illustrates a perspective top view of a component, according to an embodiment of the present disclosure.
Figure 3B:
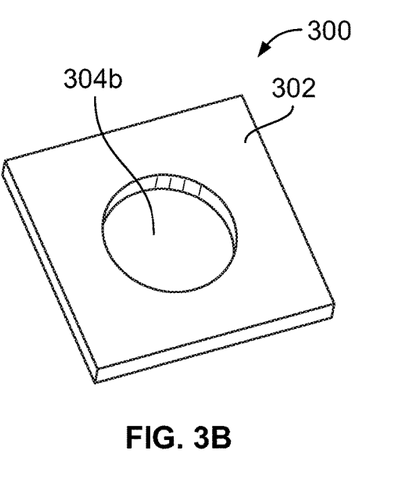
FIG. 3B illustrates a perspective top view of a component, according to an embodiment of the present disclosure.
Figure 3C:
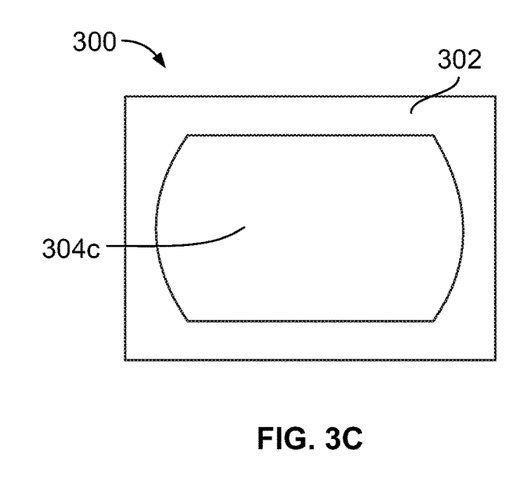
FIG. 3C illustrates a perspective top view of a component, according to an embodiment of the present disclosure.
Figure 3D:
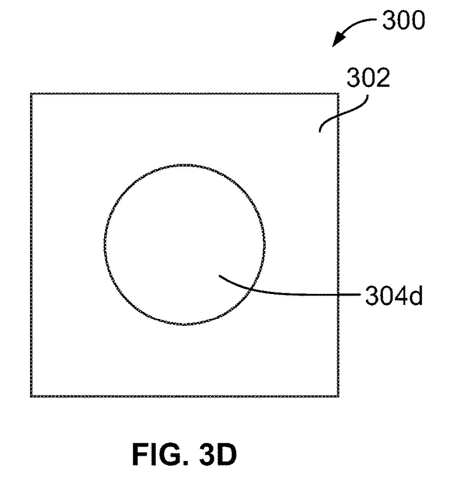
FIG. 3D illustrates a perspective top view of a component, according to an embodiment of the present disclosure.

FIG. 1C illustrates a top view of the grommet 100. FIG. 1D illustrates an axial cross-sectional view of the grommet 100 through line 1D-1D of FIG. 1C. FIG. 1E illustrates a bottom view of the grommet 100. FIG. 1F illustrates a lateral view of the grommet 100. Referring to FIGS. 1C-1F, the passage 110 includes an end opening 118 defined by an inner diameter 120 of the collar 106 that connects to the end opening 116 defined by an inner diameter 122 of the rim 114. An inwardly-canted inner ledge 124 decreases a diameter of the passage 110 proximate to a middle section 126 of the grommet 100. A reduced neck 128 between the ledge 124 and the end opening 116 decreases the diameter of the passage 110 in relation to the end openings 116 and 118. The end opening 116 is defined by an outwardly-flared inner wall 130 that outwardly flares from the reduced neck 128.

As shown, the surface 115 of the base 104 and a surface 131 of the collar 106 may be flat, planar surfaces. The surfaces 115 and 131 may be parallel with one another. An outer circumferential surface 132 of the rim 114 may be generally perpendicular to the surface 115 of the base 104.

FIGS. 2A, 2B, 2C, and 2D illustrate a lateral view, an axial cross-sectional view, a perspective top view, and a perspective bottom view, respectively, of a fastener assembly 200 including the grommet 100 secured thereto, forming a sub-assembly 202, according to an embodiment of the present disclosure. Referring to FIGS. 2A-2D, the sub-assembly 202 includes a fastener 204 (such as a bolt), a bushing 206, and the grommet 100.

The fastener 204 includes a head 208 connected to a shaft 210. The shaft 210 includes a first segment 212 that extends downwardly from the head 208. An inwardly-recessed circumferential indentation 214 is formed at a lower end of the first segment 212. A protuberance (such as a flat ledge 216, bump, barb, ridge, rim, or the like) radially and outwardly extends below the indentation 214. A ramp 218 inwardly-cants from the ledge 216 to form another circumferential indentation 220 that connects to a second segment 222 having a distal reduced diameter tip 224.

The bushing 206 includes a first circumferential flange 226 that connects to an opposed second circumferential flange 228 through a cylindrical tube 230 that defines an interior channel 232. The first and second flanges 226 and 228 outwardly and radially extend from opposite ends of the tube 230. The first flange 226 has a greater diameter than that of the second flange 228.

The bushing 206 is slid onto the shaft 210 of the fastener 204 until the bushing 206 abuts into a lower surface of the head 208. The grommet 100 fits around the tube 230 of the bushing 206 such that the surface 131 of the collar 106 abuts into a lower surface of the first flange 226. The interior reduced neck 128 of the grommet 100 abuts into an outer surface of the tube 230 of the bushing 206, thereby providing a secure connection thereto (such as via an interference fit). Gaps 231 and 233 are formed between the inner diameter 120 and the inner wall 130, respectively, of the grommet 100 and the outer surface of the tube 230.

Accordingly, the sub-assembly 202 may be formed by fitting the grommet 100 around the bushing 206, and then fitting the bushing 206 and retained grommet 100 onto the fastener 204. Optionally, the bushing 206 may first be fit around the fastener 204, and then the grommet 100 may be fit onto the bushing 206. An outer circumferential edge of the ledge 216 may abut into an interior surface of the tube 230, thereby providing a secure, retained connection thereto (such as via a press fit or interference connection).

FIGS. 3A, 3B, 3C, and 3D illustrate perspective top views of component 300 (such as portion of an engine cover), according to an embodiment of the present disclosure. The components 300 may include flat panels 302 having openings 304a, 304b, 304c, and 304d formed therethrough. The openings 304a, 304b, 304c, and 304 differ in size and/or shape. The openings 304a, 304b, 304c, and 304d may have different sizes and shapes other than shown.

Figure 4A:
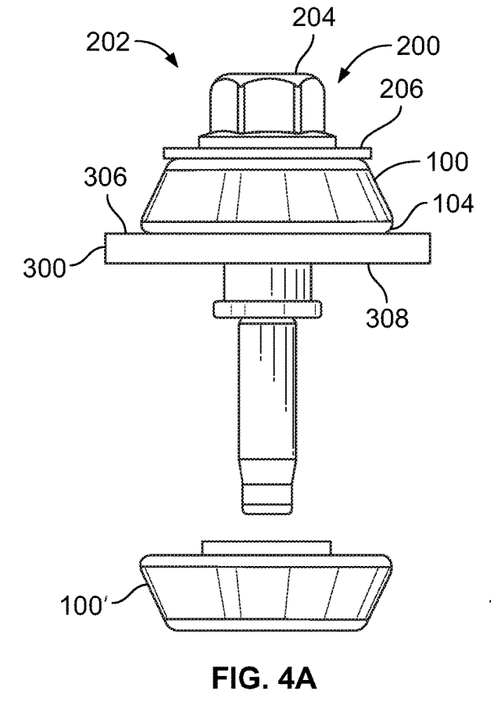
FIG. 4A illustrates a lateral view of a fastener sub-assembly coupled to a component, according to an embodiment of the present disclosure.
Figure 4B:
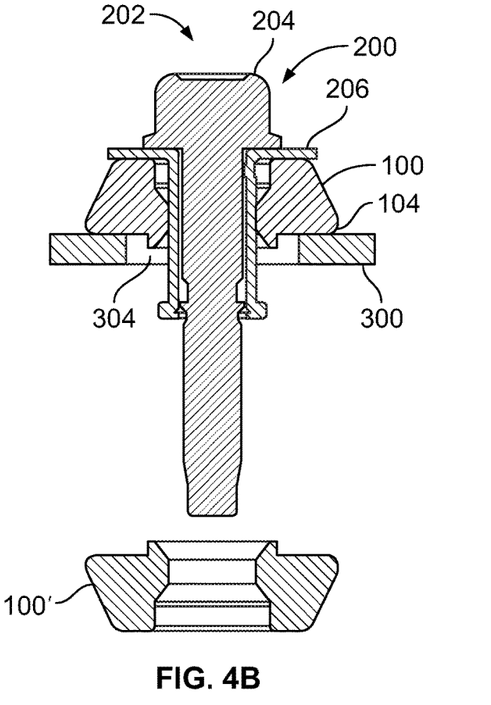
FIG. 4B illustrates an axial cross-sectional view of a fastener sub-assembly coupled to a component, according to an embodiment of the present disclosure.
Figure 4C:
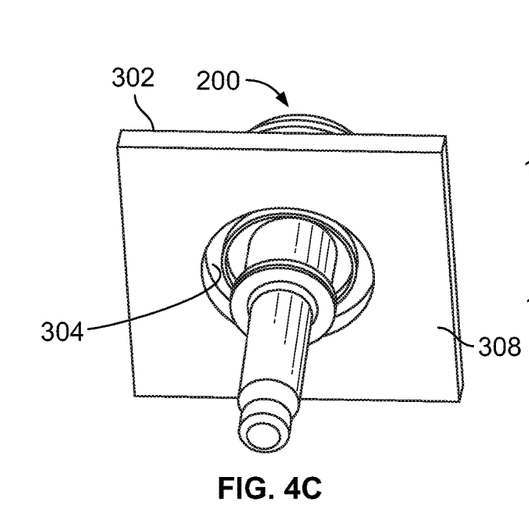
FIG. 4C illustrates a perspective bottom view of a fastener sub-assembly coupled to a component, according to an embodiment of the present disclosure.

FIG. 4A illustrates a lateral view of the fastener sub-assembly 202 coupled to a component 300, according to an embodiment of the present disclosure. FIG. 4B illustrates an axial cross-sectional view of the fastener sub-assembly 202 coupled to the component 300. FIG. 4C illustrates a perspective bottom view of the fastener sub-assembly 202 coupled to the component 300. Referring to FIGS. 4A-4C, the opening 304 of the component 300 is axially aligned with the fastener 204. The component 300 is then urged onto the fastener 204 until a surface 306 of the component 300 surrounding the opening 304 abuts into the base 104 of the grommet 100. In order to completely form the fastener assembly 200, another grommet 100', which is inverted in relation to the grommet 100, is axially aligned with the fastener 204 and urged onto the fastener 204 towards the grommet 100.

Figure 4D:
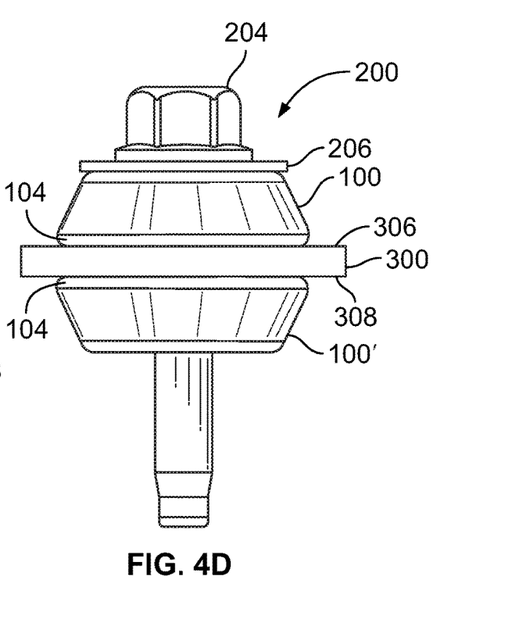
FIG. 4D illustrates a lateral view of a fastener assembly securely coupled to a component, according to an embodiment of the present disclosure.

FIG. 4D illustrates a lateral view of the fastener assembly 200 securely coupled to the component 300, according to an embodiment of the present disclosure. As shown, the component 300 is sandwiched between the opposed and inverted grommets 100 and 100'. The surface 306 of the component 300 abuts into the base 104 of the grommet 100, while an opposite surface 308 of the component 300 abuts into the base 104 of the grommet 100'. As shown in FIG. 4D, two separate and distinct grommets 100 and 100' may be secured on either side of the component 300, in contrast to an H-style grommet that would be shoved through a hole of the component 300.

The grommet 100 is not fixed to the grommet 100'. That is, the grommets 100 and 100' are separate and distinct structures that do not form an integrally formed single piece. Further, the grommets 100 and 100' are not securely together through adhesives, for example.

Figure 5:
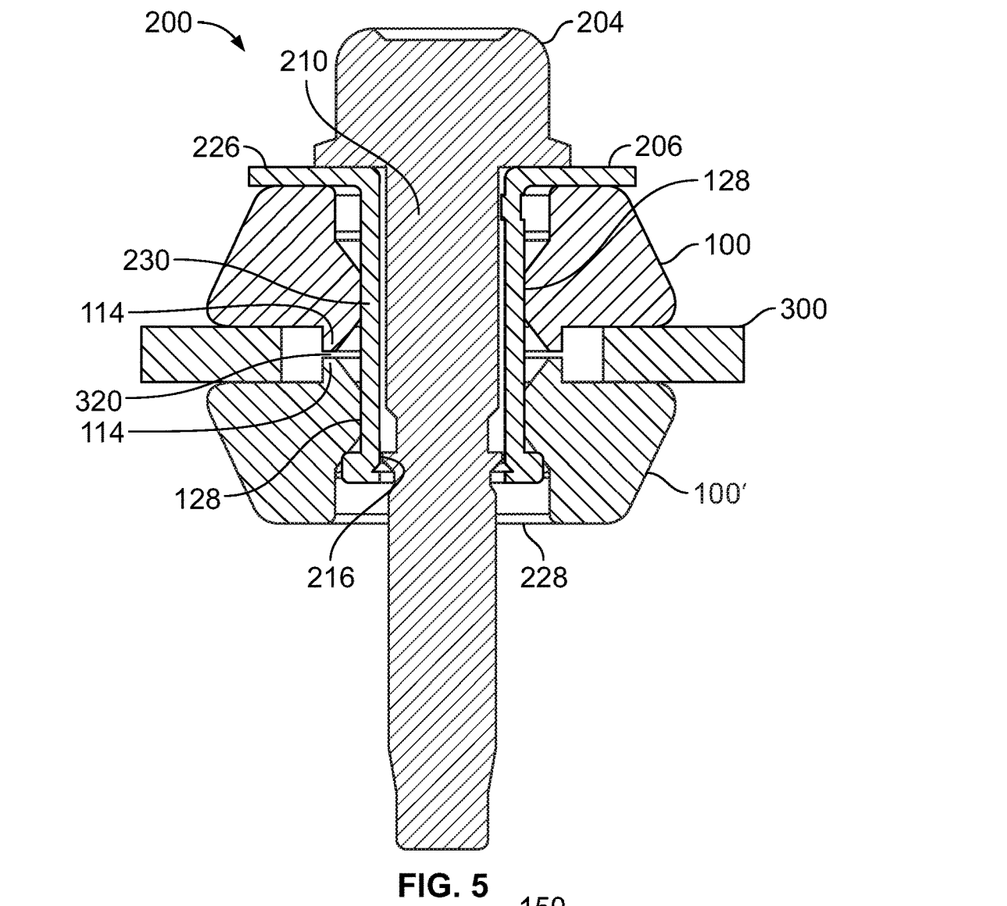
FIG. 5 illustrates an axial cross-sectional view of a fastener assembly, according to an embodiment of the present disclosure.

FIG. 5 illustrates an axial cross-sectional view of the fastener assembly 200, which is fully formed by the opposed and inverted grommets 100 and 100'. As shown, the component 300 is trapped between the opposed and inverted grommets 100 and 100'. Further, the grommets 100 and 100' are securely retained by the flanges 226 and 228 of the bushing 206. Because the grommets 100 and 100' are formed from resilient and flexible material (such as rubber), the grommets 100 and 100' outwardly flex when being loaded over the flange 228, and inwardly flex back after the grommets 100 and 100' pass above the flange 228. In this manner, the grommets 100 and 100' are easily pushed over the flange 228 into a retained position. In the retained position, the grommets 100 and 100' are in at-rest states, such that the reduced necks 128 defined diameters that are less than an outer diameter of the flange 228, thereby ensuring that the bushing 206 retains the grommets 100 and 100'. The fastener 204 may be securely retained by the bushing 206, such as through interaction between an interior surface of the tube 230 and outer portions of the shaft 210, such as the radial ledge 216.

As shown, outer edges of the rims 114 of the grommets 100 and 100' are separated by a gap 320 in an at-rest state. However, as the grommets 100 and 100' are urged toward another in a compressed state, the gap 320 is eliminated, minimized, or otherwise reduced. In at least one embodiment, opposed rims 114 of the grommets 100 and 100' may interlock and/or overlap in a compressed state.

The flange 228 provides a foot or other such feature that is configured to retain the grommets 100 and 100', as described. Optionally, the bushing 206 may not include the flange 228. Instead, the grommets 100 and 100' may securely couple to the bushing 206 via a press fit, interference fit, or the like.

Figure 6:
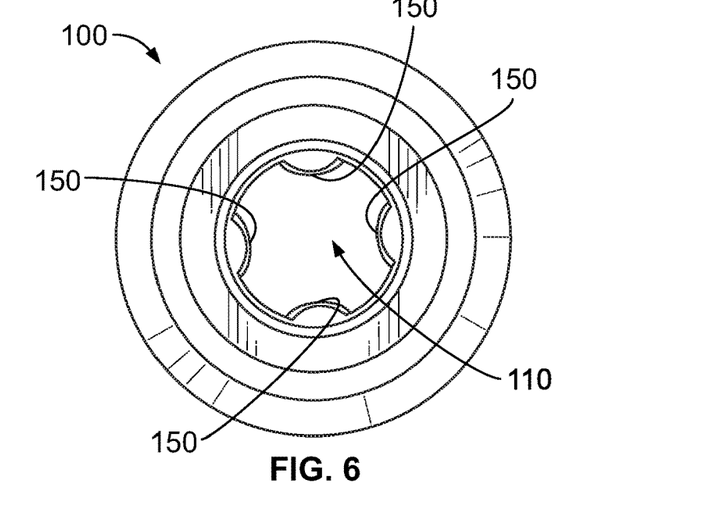
FIG. 6 illustrates a top view of a grommet, according to an embodiment of the present disclosure.

FIG. 6 illustrates a top view of the grommet 100, according to an embodiment of the present disclosure. In this embodiment, the grommet 100 may include inwardly-directed protuberances 150 (such as rounded bumps, ridges, ribs, or the like) that extend inwardly into the central passage 110. The protuberances 150 are configured to securely abut into an outer surface of the bushing 206 (shown in FIG. 5, for example) in order to provide a secure, robust connection between the grommet 100 and the bushing 206. The grommet 100 shown in FIG. 6 may be particularly well-suited to be used with a bushing 206 that does not include the flange 228. The grommet 100 may include more or less protuberances 150 than shown. The protuberances 150 may be used with any of the embodiments of the present disclosure.

Figure 7:
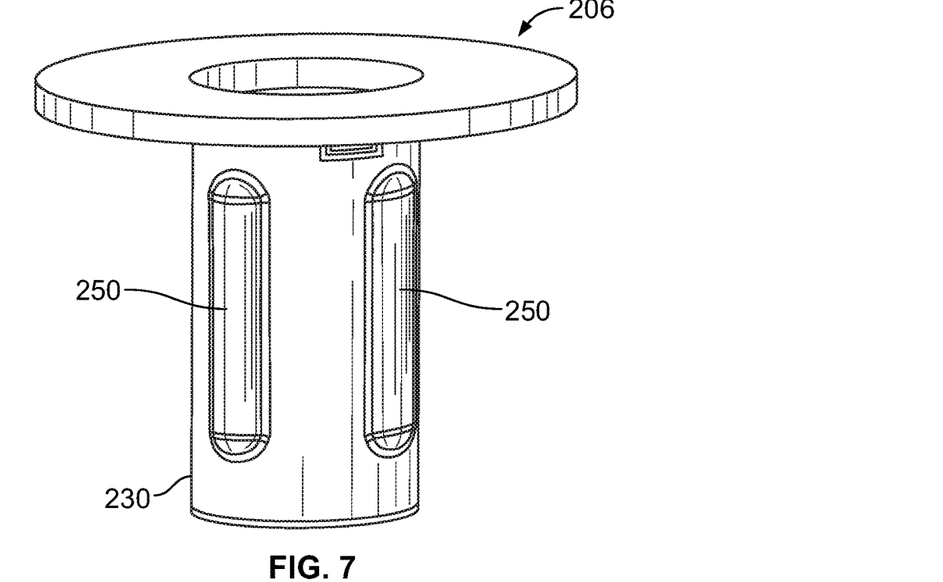
FIG. 7 illustrates a perspective lateral view of a bushing, according to an embodiment of the present disclosure.

FIG. 7 illustrates a perspective lateral view of a bushing 206, according to an embodiment of the present disclosure. In this embodiment, outwardly-directed protuberances 250 (such as rounded bumps, ridges, ribs, or the like) outwardly extend from an outer surface of the tube 230. The protuberances 250 are configured to securely abut into an interior surface of the grommet 100 (shown in FIGS. 1A-1F, for example) that define at least a portion of the central passage 110 (shown in FIG. 1D, for example) in order to provide a secure, robust connection between the grommet 100 and the bushing 206. As shown, the bushing 206 does not include a lower flange. The flange 206 may include more or less protuberances 250 than shown. The protuberances 250 may be used with any of the embodiments of the present disclosure.

Figure 8A:
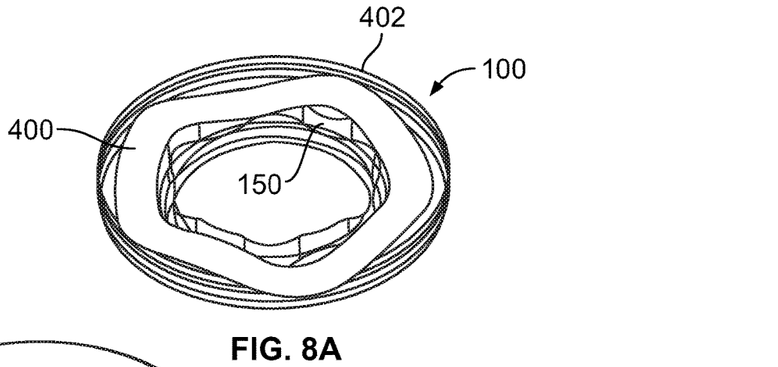
FIG. 8A illustrates a perspective interior view of a grommet, according to an embodiment of the present disclosure.
Figure 8B:
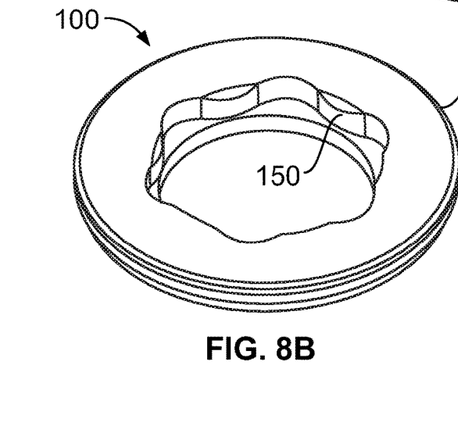
FIG. 8B illustrates a perspective top view of a grommet, according to an embodiment of the present disclosure.
Figure 8C:
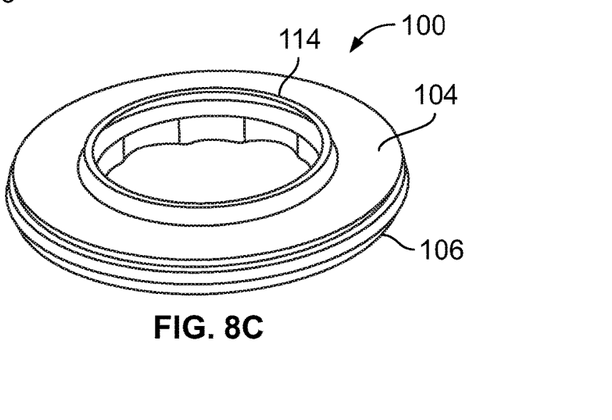
FIG. 8C illustrates a perspective top view of a grommet, according to an embodiment of the present disclosure.

FIGS. 8A, 8B, and 8C illustrate a perspective interior view, a perspective top view, and a perspective bottom view, respectively, of a grommet 100, according to an embodiment of the present disclosure. Referring to FIGS. 8A-C, the grommet 100 may not include a tapered circumferential wall between the base 104 and the collar 106. Further, the grommet 100 may include protuberances 150, such as described with respect to FIG. 6. Optionally, the grommet 100 may not include the protuberances 150.

The grommet 100 may include a metal core 400 over which an elastomeric isolator 402 is molded. The metal core 400 may be a waved metal core. Optionally, the metal core 400 may be a flat, planar metal core. The metal core 400 provides a stiffer, more robust grommet 100. U.S. Pat. No. 8,454,290, entitled "Bushing Assembly," which is assigned to Illinois Tool Works Inc., and is hereby incorporated by reference in its entirety, discloses a fastener assembly that includes a bushing having a flange configured to be urged toward a work-piece, and an isolation spring configured to be positioned between the flange and the work-piece. U.S. Pat. No. 8,926,247, entitled "Washer Assembly," which is also assigned to Illinois Tool Works Inc., and is also hereby incorporated by reference in its entirety, discloses a washer assembly that is configured to isolate a work-piece from a fastener and/or another structure.

Any of the grommets 100 or 100' described herein may include a metal core 400, such as shown and described with respect to FIG. 8A. That is, any of the embodiments of the present disclosure may include a grommet having a metal core.

Figure 9A:
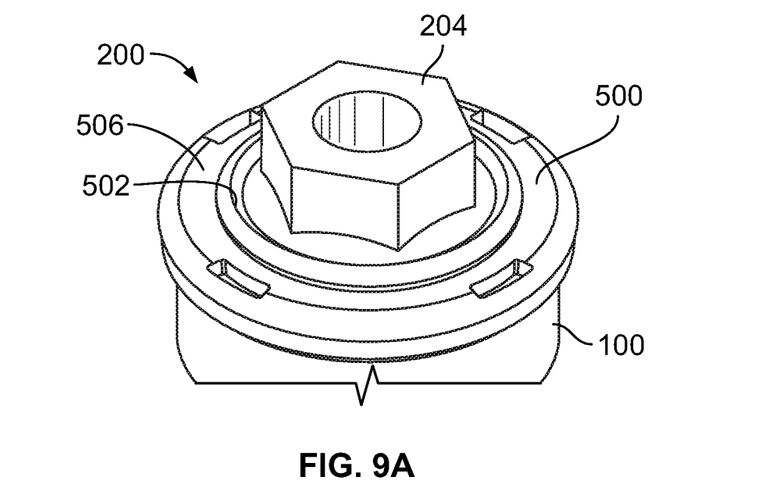
FIG. 9A illustrates a perspective top view of a fastener assembly, according to an embodiment of the present disclosure.
Figure 9B:
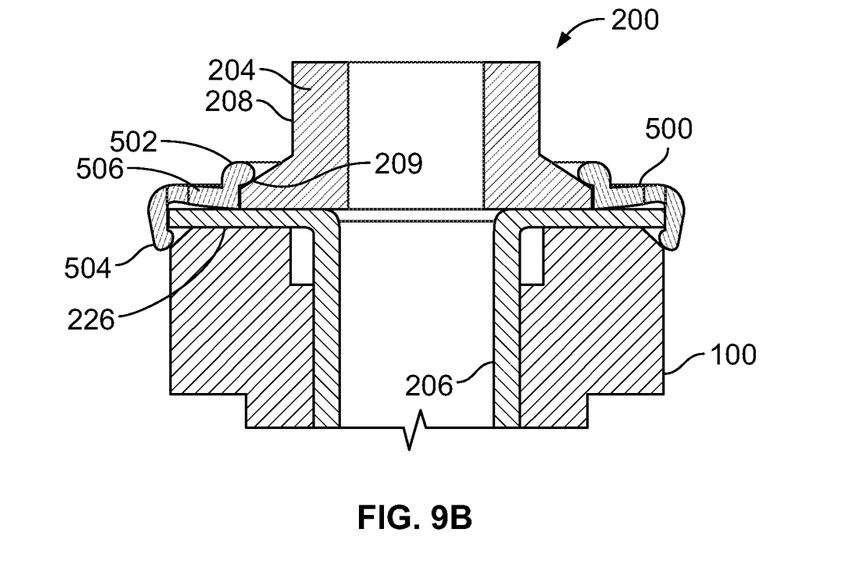
FIG. 9B illustrates an axial cross-sectional view of a portion of a fastener assembly, according to an embodiment of the present disclosure.

FIGS. 9A and 9B illustrate a perspective top view, and axial cross-sectional view of a portion, respectively, of a fastener assembly 200, according to an embodiment of the present disclosure. Referring to FIGS. 9A and 9B, the fastener assembly 200 may include a retaining nut 500 (which may be formed of plastic) that securely clamps the head 208 of the fastener 204 to the flange 226 of the bushing 206. The retaining nut 500 includes an interior ledge 502 that securely clamps over an outer radial edge 209 of the head 208. The ledge 502 connects to an outer circumferential clip 504 through a circumferential annular wall 506. The clip 504 securely clips underneath an outer edge of the flange 226. In this manner, the retaining nut 500 securely couples the fastener 204 to the bushing 206. The retaining nut 500 may be used with any of the embodiments of the present disclosure.

Figure 10:
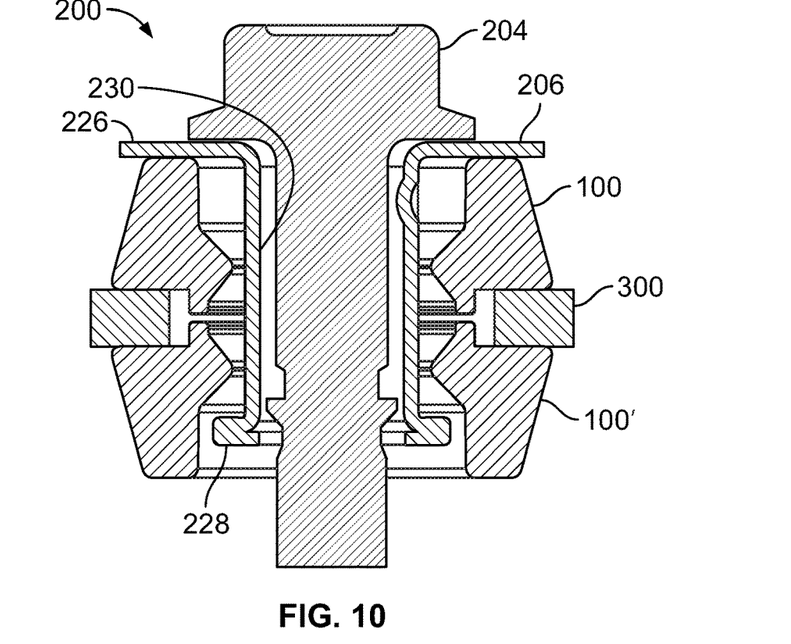
FIG. 10 illustrates an axial cross-sectional view of a fastener assembly secured to a component, according to an embodiment of the present disclosure.

FIG. 10 illustrates an axial cross-sectional view of a fastener assembly 200 secured to a component 300, according to an embodiment of the present disclosure. In this embodiment, the grommets 100 and 100' do not compressively contact the tube 230 of the bushing 206. Instead, the inner diameters of the grommets 100 and 100' are separated from the outer surface of the tube 230 by spaces. The grommets 100 and 100' are securely retained between the flanges 226 and 228 of the bushing 206. The clearances spaces between the tube 230 and the flanges 100 and 100' allow for the fastener 204 and/or the bushing 206 to axially shift relative to the grommets 100 and 100' and the component 300. In this manner, the fastener assembly 200 may positionally shift relative to the component 300 in order to accommodate different positions, spaces, and the like.

Figure 11:
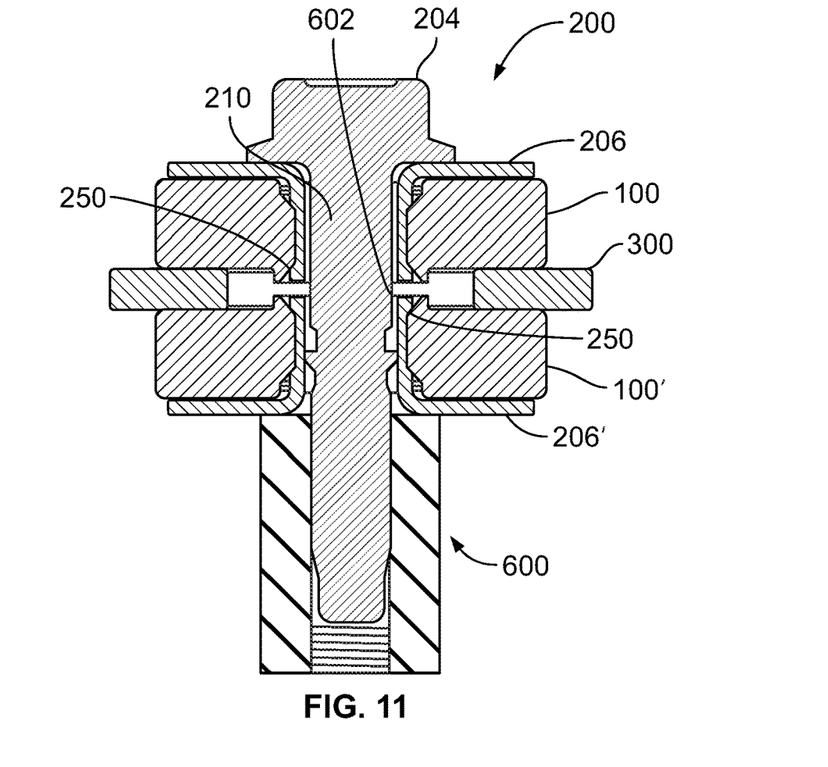
FIG. 11 illustrates an axial cross-sectional view of a fastener assembly secured to a component, according to an embodiment of the present disclosure.

FIG. 11 illustrates an axial cross-sectional view of a fastener assembly 200 secured to a component 300, according to an embodiment of the present disclosure. In this embodiment, two separate and distinct bushings 206 and 206' may be used. The bushings 206 and 206' may be inverted in relation to one another. Further, as shown, the grommets 100 and 100' may be disc-shaped without tapered outer walls. The fastener 100 may be secured to a threaded boss 600. The bushings 206 and 206' may include outwardly-directed protuberances 250 that are configured to securely couple to portions of the grommets 100 and 100'. In this manner, the bushings 206 and 206' may securely retain the grommets 100 and 100', respectively. Additionally, the bushings 206 and 206' may include inwardly-directed protuberances 602 that are configured to abut into outer surfaces of the shaft 210 of the fastener 204 to securely couple the bushings 206 and 206' to the fastener 204. Any of the embodiments of the present disclosure may include bushings 206 or 206' having the protuberances 250 and/or 602.

Referring to FIGS. 1-11, embodiments of the present disclosure provide a fastener assembly 200 that is configured to securely couple to a component 300. The fastener assembly 200 includes at least one bushing 206, a first grommet 100 that is coupled to the bushing(s) 206, and a second grommet 100 that is coupled to the bushing(s) 206. The first and second grommets 100 are configured to securely retain the component 300 therebetween.

Embodiments of the present disclosure provide a fastener assembly that includes one or more grommets that are easily, safely, and securely coupled to a component. Further, embodiments of the present disclosure provide a simple process of securing a grommet to a component that is not susceptible to damaging the grommet.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

To the extent used in the appended claims, the terms "including" and "in which" are used as the plain-English equivalents of the respective terms "comprising" and "wherein." Moreover, to the extent used in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

Various features of the disclosure are set forth in the following claims.

The invention claimed is:

1. A fastener assembly that is configured to securely couple to a component, the fastener assembly comprising:
at least one bushing;
a first grommet that is coupled to the at least one bushing; and
a second grommet that is coupled to the at least one bushing, wherein the first grommet and the second grommet are configured to securely retain the component therebetween, and wherein at least one of the first grommet and the second grommet includes a reduced neck formed within a central passage and defined between an inwardly-canted inner ledge and an outwardly-flared inner wall; and
wherein the at least one bushing comprises at least one outwardly-directed protuberance that abuts into an inner portion of at least one of the first grommet and the second grommet to securely couple the at least one bushing to at least one of the first grommet and the second grommet.

2. The fastener assembly of claim 1, wherein one of the first grommet or the second grommet securely couples to the at least one bushing to form a fastener sub-assembly, wherein the fastener sub-assembly is formed by fitting the first grommet or the second grommet around the bushing, and fitting the bushing onto a fastener.

3. The fastener assembly of claim 1, wherein at least one of the first grommet and the second grommet comprises:
a base integrally connected to a collar that is opposite from the base through a circumferential outer wall, wherein the central passage is formed through the grommet between and through the base and the collar; and
a rim outwardly extending from a surface of the base.

4. The fastener assembly of claim 3, wherein the outer wall tapers inwardly from the base to the collar.

5. The fastener assembly of claim 3, wherein the central passage comprises a first end opening defined by an inner diameter of the collar that connects to a second end opening defined by an inner diameter of the rim, wherein the inwardly-canted inner ledge forms a decreased diameter of the central passage proximate to a middle section, wherein the reduced neck is defined between the inner ledge and the second end opening, and wherein the second end opening is defined by the outwardly-flared inner wall that outwardly flares from the reduced neck.

6. The fastener assembly of claim 1, further comprising a fastener including a shaft that is retained within an interior channel of a tube of the at least one bushing.

7. The fastener assembly of claim 6, wherein the fastener comprises at least one protuberance that is configured to abut into an inner surface of the tube to securely couple the fastener to the at least one bushing.

8. The fastener assembly of claim 6, further comprising a retaining nut that securely clamps a head of the fastener to a flange of the at least one bushing.

9. The fastener assembly of claim 1, wherein the first grommet is inverted in relation to the second grommet, and wherein the first grommet and the second grommet are configured to be on opposite sides of the component.

10. The fastener assembly of claim 1, wherein each of the first grommet and the second grommet are separately coupled to the at least one bushing.

11. The fastener assembly of claim 1, wherein the first grommet is not fixed to the second grommet.

12. The fastener assembly of claim 1, wherein the first grommet comprises a first rim, and the second grommet comprises a second rim, wherein the first rim is oriented toward the second rim, wherein a gap is formed between the first rim and the second rim in an at-rest state, and wherein the gap is reduced when the first grommet is compressed into the second grommet.

13. The fastener assembly of claim 1, wherein each of the first grommet and the second grommet comprises at least one inwardly-directed protuberance that abuts into an outer portion of the at least one bushing to securely couple the first grommet and the second grommet to the at least one bushing.

14. The fastener assembly of claim 1, wherein one or both of the first grommet and the second grommet comprises an elastomeric isolator molded onto a metal core.

15. The fastener assembly of claim 1, wherein one or both of the first grommet and the second grommet are spaced apart from a tube of the at least one bushing.

16. The fastener assembly of claim 2, wherein the at least one bushing comprises a first bushing and a second bushing, wherein the first grommet is securely coupled to the first bushing, and wherein the second grommet is securely coupled to the second bushing.

17. A fastener assembly that is configured to securely couple to a component, the fastener assembly comprising:
    at least one bushing;
    a first grommet that is coupled to the at least one bushing;
    a second grommet that is coupled to the at least one bushing, wherein the first grommet and the second grommet are configured to securely retain the component therebetween, and wherein at least one of the first grommet and the second grommet includes a reduced neck formed within a central passage and defined between an inwardly-canted inner ledge and an outwardly-flared inner wall; and
    a fastener including a shaft that is retained within an interior channel of a tube of the at least one bushing, wherein the at least one bushing comprises at least one protuberance that is configured to abut into an exterior surface of the fastener to securely couple the fastener to the bushing.

18. The fastener assembly of claim 17, wherein the at least one bushing comprises at least one outwardly-directed protuberance that abuts into an inner portion of at least one of the first grommet and the second grommet to securely couple the at least one bushing to at least one of the first grommet and the second grommet.

\* \* \* \* \*